United States Patent Office 3,198,732
Patented Aug. 3, 1965

3,198,732
TIRE YARN FINISH
Robert A. Olney, Woodside Hills, Wilmington, Del., assignor to Atlas Chemical Industries, Inc., Wilmington, Del., a corporation of Delaware
No Drawing. Filed June 12, 1962, Ser. No. 201,805
10 Claims. (Cl. 252—8.9)

This invention relates to an improved tire yarn finish, and in particular, to a composition of matter useful as a tire yarn finish which comprises an emulsifier/lubricant component and an emulsifier/rewetter/adhesive component.

One of the principal problems involved in the manufacture of tires is the production of a firm, durable adhesion bond between the tire cord and the tire rubber. Failure to properly form this bond during the manufacture of the tire is considered to be the cause of premature tire fatigue failure.

In order to improve cord-to-rubber adhesion, the tire cord is usually coated with a latex based coating prior to its incorporation into the tire. The operation in which this latex coating is applied to the tire cord is commonly referred to as "dipping" and is essential to the production of a good tire.

Prior to the formation of tire cord, a textile finish is applied to the tire yarn. This finish has several functions:

(1) To provide the proper lubrication to insure minimum strength loss during the twisting operation in which tire yarns are twisted together to make cord.

(2) To impart proper suppleness to the yarn so that it will withstand the repeated extension and contraction to which it is subjected in use.

(3) To interfere as little as possible with, and preferably enhance, proper latex dip pick-up.

(4) To interfere as little as possible with, and preferably enhance, proper adhesion between the tire cord and the tire rubber.

Currently used textile finishes generally perform functions (1) and (2) quite satisfactorily but they interfere with proper latex dip pick-up and proper adhesion between the tire cord and the tire rubber.

It is an object of this invention to provide an improved lubricant for tire yarn.

Another object is to provide a tire yarn finish which improves latex dip pick-up.

A further object of the invention is to provide a tire yarn which yields improved cord-to-rubber adhesion.

Other objects and purposes of this invention will be apparent to those skilled in the art in view of the description which follows:

It has been discovered that an improved tire yarn finish can be prepared by combining two materials, one of which functions as an emulsifier/lubricant and the other material functions as an emulsifier/rewetter/adhesive. In addition to these two materials, the tire yarn finish may also contain a lubricating oil and a coupling or clarifying agent.

In accordance with this invention, the emulsifier/lubricant component comprises an ethylene oxide derivative of castor oil. The castor oil may be either hydrogenated or unhydrogenated, and as used in this specification and the claims which follow, the term "castor oil" is meant to include both hydrogenated and unhydrogenated castor oil. The ethylene oxide ether of castor oil may contain from about 10 to about 300 ethylene oxide groups per molecule. The emulsifier/lubricant component functions as a lubricant for the tire yarn and also helps to disperse any lubricating oil which may be present in the tire yarn finish composition.

The emulsifier/rewetter/adhesive component comprises an ethylene oxide derivative of a sorbitol rosinate ester. In general, any source of rosin acids which contains at least about 35 percent by weight of rosin acids may be used to prepare this component. A readily available and plentiful source of rosin acids may be found in tall oil. The ethylene oxide ether of sorbitol rosinate may contain from about 10 to about 100 ethylene oxide groups per molecule. In preparing the ethylene oxide ether of sorbitol rosinate, the sorbitol may be reacted with a rosin acid source first and thereafter the ester reacted with ethylene oxide, or alternatively, the sorbitol may be reacted with ethylene oxide, and then the ether which is formed may be reacted with a rosin acid source. It is generally preferred to react the sorbitol with ethylene oxide and then esterify the ether which is formed in order to avoid anhydrization of the sorbitol. Since these esterification and etherification reactions are well known, a detailed description is unnecessary herein. In addition, it should be noted that emulsifier/rewetter/adhesive component may contain from one to six ester groups.

The emulsifier/rewetter/adhesive component serves several functions in the tire yarn finish composition. It aids in the dispersion of any lubricating oil which may be present in the composition. It functions as a rewetter by improving the absorption of the aqueous latex dip by the tire yarn. In addition, it promotes the firm bonding of the tire cord to the tire rubber by forming an adhesive during the vulcanization of the tire.

In addition to the two components discussed above, the tire yarn finish compositions of this invention may also contain a lubricating oil and a coupling or clarifying agent if desired or necessary. It is generally preferred to have a lubricating oil present in the tire yarn finish in order to insure minimum strength loss during the twisting operation when the yarns are twisted to make cord. Any liquid lubricant which retains its liquidity at temperatures of about 20° C. may be used. Examples of liquid lubricating oils which may be used are mineral oils, whether of naphthenic, aliphatic, aromatic or mixed character, butyl stearate, and fats or oils of vegetable, animal or fish origin.

In some cases, it may be necessary or desirable to include a coupling or clarifying agent in the finish composition. These agents help to improve the stability of the composition and may aid in the dispersion of the lubricating oil. In general, liquids having a low HLB value (hydrophile/lipophile balance) are useful coupling agents, such as glyceryl monooleate and sorbitan monooleate. In some instances, it may be possible to improve the stability of the composition by adding a small amount of water.

The proportions of the components of the tire yarn finish compositions of this invention may vary over a wide range. In general, finish compositions having the following range of proportions are satisfactory and useful.

| Component: | Amount (wt. percent) |
|---|---|
| Emulsifier/lubricant | 20–40 |
| Emulsifier/rewetter/adhesive | 30–60 |
| Lubricating oil | 0–50 |
| Coupling agent | 0–15 |

Where the compositions comprise only the emulsifier/lubricant and emulsifier/rewetter/adhesive components, the following proportions are generally preferred.

| Component: | Amount (wt. percent) |
|---|---|
| Emulsifier/lubricant | 20–70 |
| Emulsifier/rewetter/adhesive | 30–80 |

The finish compositions of this invention are generally applied to the tire yarn in the form of dilute aqueous emulsions, i.e. oil-in-water emulsions. The concentration of the emulsion may be varied according to the operator's desire, though generally the concentration may be increased or decreased according to the amount of finish desired on the tire yarn. It has been found that emulsion concentrations ranging from about 0.1 to about 10 weight percent of tire yarn finish composition per total emulsion usually provides for satisfactory finish composition pick-up by the tire yarn. The concentration of the finish composition upon the dried yarn may range from about 0.1 to 5% by weight of the yarn, and preferably between about 0.1 and 0.5%.

The tire yarn finish compositions of this invention are stable compositions which are easy to apply uniformly to tire yarn. They are readily emulsified or diluted with water. Tire yarn or cord which is treated with these finish compositions readily accepts the latex coating which is applied in the "dipping" operation. Tire yarns or cords treated with these compositions have improved oven-dry tensile strengths and improved tire cord-to-tire rubber adhesion which reduces premature tire fatigue failure.

The following examples illustrate specific tire yarn finish compositions of this invention. The numbers in parentheses represent moles of ethylene oxide. The polyoxyethylene sorbitol tetra tall oil was prepared by first reacting sorbitol with ethylene oxide and then esterifying the resulting product with tall oil.

*Examples I–III*

| Component: | Amount (wt. percent) |
|---|---|
| (I) | |
| Polyoxyethylene (25) hydrogenated castor oil | 30 |
| Polyoxyethylene (20) sorbitol tetra tall oil | 40 |
| Butyl stearate | 30 |
| (II) | |
| Polyoxyethylene (25) hydrogenated castor oil | 30 |
| Polyoxyethylene (20) sorbitol tetra tall oil | 40 |
| Sorbitan monooleate | 10 |
| Highly refined paraffinic mineral oil | 20 |
| (III) | |
| Polyoxyethylene (25) hydrogenated castor oil | 30 |
| Polyoxyethylene (20) sorbitol tetra tall oil | 40 |
| Castor oil | 30 |

*Example IV*

The compositions of Examples I to III were used to prepare 10% by weight aqueous emulsions. The stability of the emulsions after 24 hours indicated the following.

| Emulsion containing the composition of example: | Stability |
|---|---|
| I | 3% cream separated on top. |
| II | No separation. |
| III | 3% cream separated on top. |

These results indicate that the tire yarn finish compositions of Examples I to III formed quite stable emulsions, especially the Example II composition which contained a coupling agent.

*Example V*

The compositions of Examples I to III were used to prepare 6% by weight aqueous solutions which were applied to nylon yarn. 400 denier, 68 filament nylon yarn was used for this test. After one dipping, the following finish composition pick-up was noted.

| Solution containing the composition of example: | Percent applied based on the weight of yarn |
|---|---|
| I | 1.13 |
| II | 1.04 |
| III | 0.99 |

The treated nylon yarn was then tested for yarn-to-yarn friction and each of the yarns showed moderate friction values which is desirable during the twisting operation.

It should be noted that the tire yarn finish compositions of this invention may be applied to all types of tire yarns, but are particularly effective when applied to rayon. Examples of yarns which may be treated include cellulosic fibers, natural fibers such as cotton and synthetic fibers such as nylon, polyacrylonitrile and polyester fibers.

Having completely described this invention, what is claimed is:

1. A composition of matter consisting essentially of from about 20 to about 70% by weight of an ethylene oxide ether of castor oil containing from about 10 to about 300 ethylene oxide groups per molecule and from about 30 to about 80% by weight of an ethylene oxide derivative of a sorbitol rosinate ester prepared from a fatty acid source containing at least about 35% by weight of rosin acids and said ethylene oxide derivative containing from about 10 to about 100 ethylene oxide groups per molecule.

2. A composition of matter in accordance with claim 1 in which the fatty acid source containing at least about 35% by weight of rosin acids is tall oil.

3. A composition of matter in accordance with claim 2 in which the ethylene oxide ether of castor oil contains about 25 ethylene oxide groups per molecule and the ethylene oxide derivative of a sorbitol rosinate ester contains about 20 ethylene oxide groups per molecule.

4. A composition of matter consisting essentially of from about 20 to about 40% by weight of an ethylene oxide ether of castor oil containing from about 10 to about 300 ethylene oxide groups per molecule, from about 30 to about 60% by weight of an ethylene oxide derivative of a sorbitol rosinate ester prepared from a fatty acid source containing at least about 35% by weight of rosin acids and said ethylene oxide derivative containing from about 10 to about 100 ethylene oxide groups per molecule, up to about 50% by weight of a lubricating oil, and up to about 15% by weight of a coupling agent.

5. A composition of matter in accordance with claim 4 in which the fatty acid source containing at least about 35% by weight of rosin acids is tall oil.

6. A composition of matter in accordance with claim 5 in which the ethylene oxide ether of castor oil contains about 25 ethylene oxide groups per molecule and the ethylene oxide derivative of a sorbitol rosinate ester contains about 20 ethylene oxide groups per molecule.

7. A textile yarn having applied thereto a composition in accordance with claim 1.

8. A textile yarn having applied thereto a composition in accordance with claim 3.

9. A textile yarn having applied thereto a composition in accordance with claim 4.

10. A textile yarn having applied thereto a composition in accordance with claim 6.

(References on following page)

References Cited by the Examiner

UNITED STATES PATENTS

| | | | |
|---|---|---|---|
| 2,690,426 | 9/54 | Jefferson et al. | 252—8.9 |
| 2,695,270 | 11/54 | Jefferson et al. | 252—8.9 |
| 2,839,464 | 6/58 | Sproule et al. | 252—8.9 |
| 2,964,470 | 12/60 | Wentworth | 252—8.9 |

FOREIGN PATENTS 591,033   1/60   Canada.

ALEXANDER H. BRODMERKEL, *Primary Examiner.*
JOHN R. SPECK, *Examiner.*